(12) United States Patent
Guma

(10) Patent No.: US 11,167,630 B1
(45) Date of Patent: Nov. 9, 2021

(54) PORTABLE AUTOMATIC VEHICLE CANOPY

(71) Applicant: Tesfa Guma, Annandale, VA (US)

(72) Inventor: Tesfa Guma, Annandale, VA (US)

( * ) Notice: Subject to any disclaimer, the term of this patent is extended or adjusted under 35 U.S.C. 154(b) by 0 days.

(21) Appl. No.: 17/300,061

(22) Filed: Mar. 1, 2021

(51) Int. Cl.
*B60J 11/04* (2006.01)

(52) U.S. Cl.
CPC .................... *B60J 11/04* (2013.01)

(58) Field of Classification Search
CPC ........................................................ B60J 11/04
USPC .......... 296/95.1, 96, 136.01, 136.02, 136.05, 296/136.06, 136; 280/762; 160/370.12
See application file for complete search history.

(56) References Cited

U.S. PATENT DOCUMENTS

| | | | | |
|---|---|---|---|---|
| 5,429,406 A * | 7/1995 | Huang | ...................... | B60J 11/00 150/166 |
| 7,337,793 B2 * | 3/2008 | Chen | ........................ | B60J 11/02 135/117 |
| 8,070,211 B2 * | 12/2011 | Suh | .......................... | B60J 11/00 296/136.01 |
| 8,419,107 B2 * | 4/2013 | Manchanda | ............. | B60J 11/06 296/136.1 |
| 8,651,555 B2 * | 2/2014 | Chan | ........................ | B60J 11/04 296/136.13 |
| 8,960,212 B2 * | 2/2015 | Majer | ...................... | B60J 11/04 135/88.07 |
| 9,770,966 B1 * | 9/2017 | Gill | .......................... | B60J 11/04 |
| 10,328,782 B2 * | 6/2019 | Sajedi | ...................... | B60J 11/04 |
| 10,792,987 B1 * | 10/2020 | Trevino | .................. | B32B 27/34 |
| 2004/0123892 A1 * | 7/2004 | Kim | ........................ | E04H 6/025 135/88.08 |
| 2006/0061132 A1 * | 3/2006 | Sua-An | .................... | B60J 11/00 296/136.01 |
| 2018/0345058 A1 * | 12/2018 | Walker | ..................... | A62C 2/10 |

* cited by examiner

*Primary Examiner* — Pinel E Romain

(57) ABSTRACT

The invention provides an improved cover for a vehicle, which includes a frame and a hinge, so that the cover can be unfolded to substantially cover the vehicle and folds back into a storage position.

7 Claims, 7 Drawing Sheets

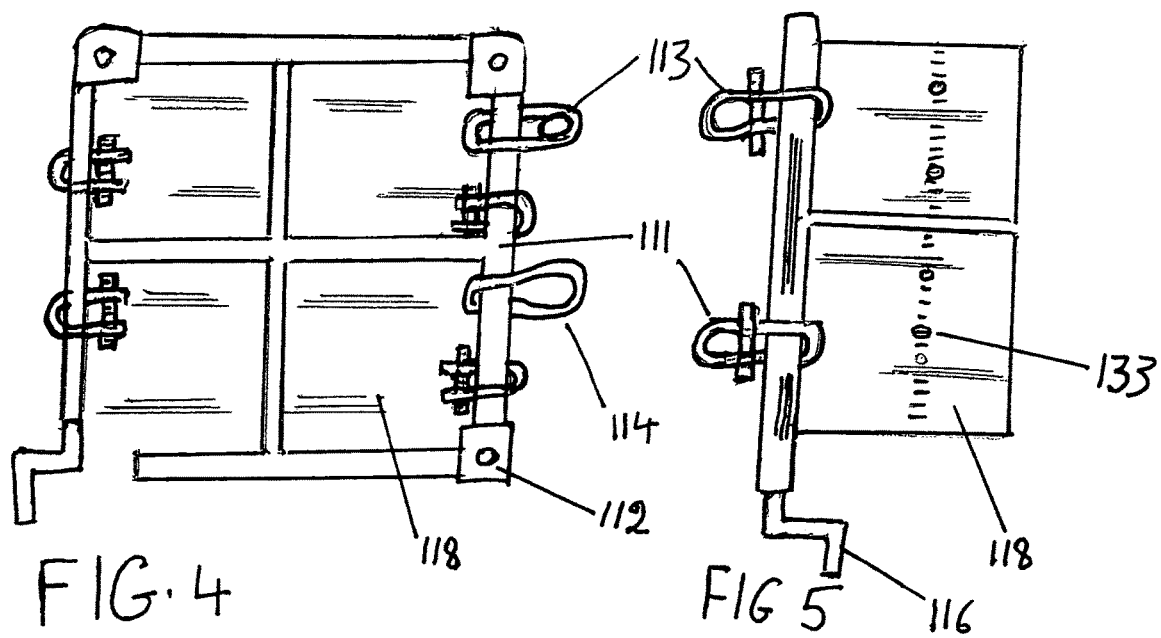
FIG. 4
FIG 5
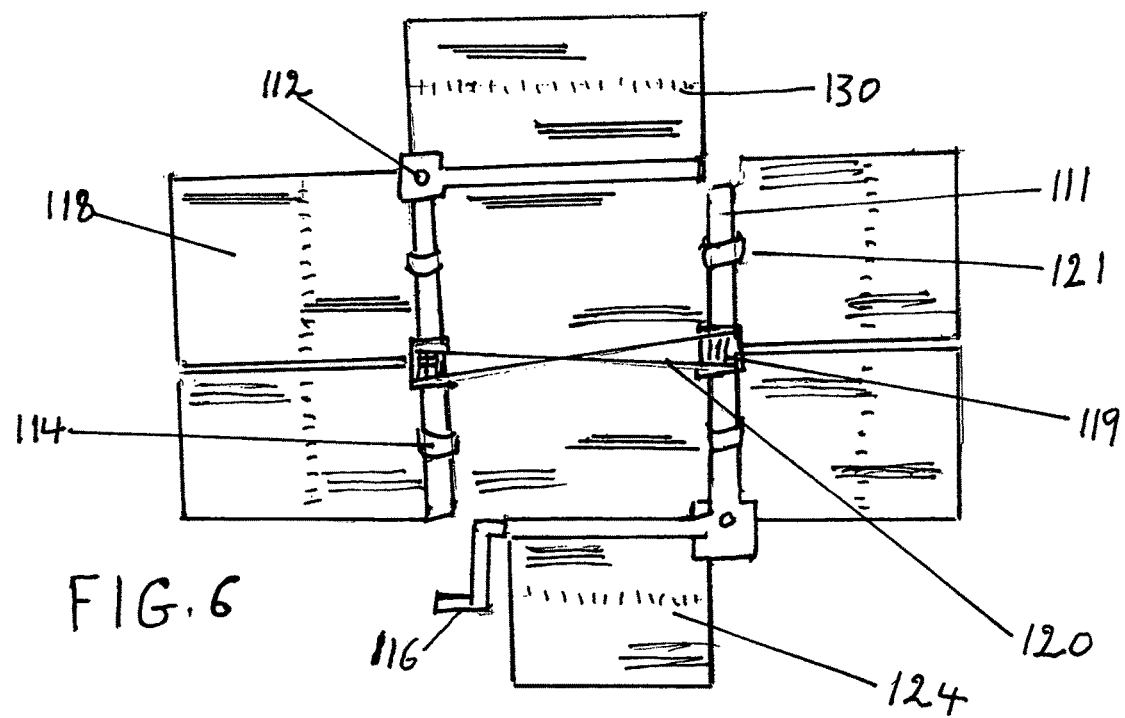
FIG. 6

PORTABLE AUTOMATIC VEHICLE CANOPY

BACKGROUND OF THE INVENTION

Field of the Invention

The present invention relates to covers. More specifically, the present invention relates to those covers which can automatically and effortlessly be unfolded from a storage position to provide covering protection for vehicles of all kinds. It teaches a simple automatic method of deploying a cover to protect a vehicle anywhere, at all times without the need for struggling with cumbersome canvas cover or without building expensive covered garage.

Description of the Prior Art

From the earliest days of vehicles with covered passenger compartments to the present, vehicle operators have contended with the elements. In summer, the sun beating down on a vehicle not only degrades the exterior finish of the vehicle, but also turns the passenger compartment into an oven. People, especially children are known to die because of the heat inside cars. Rain, particularly mud rains not only dirty the vehicle surfaces, but also permanently fade the finish. During the winter, snow and ice cake on the outside surface, particularly the windows, requiring the operator to brave the elements to scrape the windows for the purpose of enhancing driving safety. Hail may actually dent the vehicle surface or damage the finish. Bigger hail may even crack the window glasses.

To overcome these problems, car covers consisting of fabric or plastics, shaped to the form of the particular vehicle, have long been in use. Such cover may be stored in the trunk of the vehicle in a folded state, and then taken out and spread over the vehicle to provide protection. Although such cover does protect the vehicle from the elements, a number of drawbacks exist. First, the cover must be manually placed on the vehicle, manually removed and manually folded. Not only is this procedure time consuming, but also difficult for one person, especially those who do not have the energy to manage, particularly with larger vehicles. Second, freezing state may occur between the cover and the surface it lays on. Third, the contact between the surfaces may damage the vehicle surface due to smears and scratches. After a snowfall, it is necessary to clear the cover of ice and snow before it can be properly folded and stored.

To overcome these problems, automatically extending and retracting vehicle covers have been developed. Thus, U.S. Pat. No. 4,174,134 to Mathis teaches a cover which is stored on a roller. The leading edge of the cover is attached to conveyor lines. When a motor is operated, the roller turns and the lines move so as to draw the cover over the passenger compartment of the vehicle.

Several problems exist with the cover assembly disclosed in Mathis. First, the conveyor lines are directed simply by rollers. Thus, a tendency may exist for the conveyor lines to jump off of the rollers, particularly in winter when ice and snow may interfere with smooth operation. Also, although the Mathis cover might protect the upper surfaces of the vehicle, rarely does the sun shine from directly overhead and rarely does snow fall absolutely vertically, unaffected by wind. The Mathis cover provides no protection for the sides of the vehicle. Finally, if snow should fall while the cover is extended, it would be the cover so that the ice and snow is not rolled in with the cover.

U.S. Pat. No. 2,688,513 to Poirier teaches a power operated vehicle cover that solves some of the problems of the Mathis cover, yet creates additional problems. Thus, Poirier teaches the use of flaps to protect the sides of a vehicle. However, the flaps must be positioned manually, thus introducing some of the inconvenience inherent with fully manual covers. Also, although the cover extends automatically from a roll in the rear of the vehicle, it appears that no guides are employed to ensure that the cover proceeds properly from the roller. Finally, as with Mathis, if snow should fall while the cover is extended, it would be necessary to scrape the cover prior to retraction to ensure that snow is not rolled with the cover upon retraction. A number of other U.S. patents, in addition to the two discussed above also describe vehicle covers. See U.S. Pat. Nos. 4,727,898, 4,432,581, 3,992,053, 3,222,102, 3,021,894, 1,999,171, 1,918,423, 1,912,231 1,719,055.

The problems with the previous patents include: complexity of the cover system, the need for extra storage space on the vehicle, difficulty in installing cumbersome canvases every time it is to be deployed, inconvenient energy sapping task of deploying the car cover during deployment and laborious time consuming work to dispose snow and debris.

OBJECTS OF THE INVENTION

The object of this invention is to provide a portable automatic car cover which is simple to install, and easy for convenient operation. It is to solve all the above problems and more.

Vehicle owners face numerous problems which are related to protection of human life, health and economy. Cars become dirty due to dust, tree pollens, rain, mud and snow. Heat from the sun scorches the interior of the vehicle causing the upholstery to deteriorate. People also die from the heat inside the vehicle. Such heat also causes discoloration of the exterior requiring expensive car body maintenance. The need to scrape snow off the vehicle is another chore to contend with. An effective way of covering the vehicles for protection against the element remains a problem which is the object of this invention.

Covered parking facilities or covering the vehicle with fabrics are the present-day options. The problem with car canopy is that it is stationed in one place and therefore cannot be used everywhere the car is parked. Furthermore, building expensive permanent covered garage takes up too much lot space. Renting covered garage space is also an unending financial drain for those who have no other options. The difficulty in deploying the cover fabric has brought no relief to the problem. The other options are to build or rent covered car garage space or buy and install car canopy, all of which are only fixed at one spot.

Numerous patents, as indicated above, have been granted to solve these problems. Each granted patent has its own problem because it offers only partial solution to the problem It is therefore necessary to find a new way of solving the problem. Hence, the main object of this invention is to provide a simple cover for vehicles, which is easy and convenient to deploy especially by those who are incapacitated or handicapped and therefore need other people's help. More specifically the objects of the present invention are:

1. To provide a portable car cover which is convenient to handle when covering a car for protection.
2. to provide a permanently installed car cover so that the car is protected at all times, wherever it is parked.
3. to make it easy for the disabled and unwell drivers to effortlessly manipulate their car cover automatically while standing from one position, thus avoiding the need to move around the vehicle to fold or to unfold the cumbersome fabric;

4. to provide comfortable ride to the occupants of a protected car as well as to minimize the effects of death causing heat in the passenger compartment;

5. to minimize the need for frequent car wash which can save human energy, time and expense;

6. to save costly lot space normally reserved for covered garage next to the home, thus enabling home owner to add more room to the house;

7. to eliminate the parking expense in covered garages away from home;

8. to minimize cost of maintaining the interior and exterior of the car;

9. to ensure longer service life of the car and high resale value of the vehicle.

10. to convert the same car cover into an extra source of shade outside the vehicle when necessary.

SUMMARY OF THE INVENTION

The present invention overcomes the problems identified above by providing portable automatic car cover which can be deployed whenever necessary. The cover system is permanently installed or hinged to car surface. When needed, it automatically unfolds and extends outwardly to cover the outside surface of the vehicle. When it is not in use, the cover is folded back by the same automation into a storage position where it is securely held against unwanted removal.

In general, the cover comprises plurality of elongated rotatable round frames to which cover sheets are hinged. The cover flaps can be deployed one by one or all together simultaneously. The deployment is facilitated by attachment of handles which crank the rotatable frames. The automatic manipulation is done from one position near the vehicle, enabling the owner, especially the handicapped, —to cover the property conveniently without having to move around the vehicle, particularly when the snow and ice is on the ground.

Separate layer of cover sheets are hinged to the frames or directly to the roof of the vehicle to cover the roof of the vehicle. —The hinges are spring loaded to enable the operator to shake off the snow or to get rid of debris on the roof of the vehicle. To do so, the roof covers are lifted up with a handle and swung open like horizontal single casement window and turned to the side of the vehicle thus shaking and dropping off the debris away from the sides of the vehicle. To return the whole cover system into storage position, the process is reversed and the flat roof cover sheet is first folded back to lay on the roof of the vehicle before the cover sheets for the sides and hoods are folded back for storage. The stored cover sheets are secured in position by security mechanism which snaps into position to prevent flailing dangerously especially when the vehicle is in motion. When the cover sheets are in such storage position, they cannot be easily noticed on the vehicle, thus avoiding interference with the esthetics of the vehicle.

This arrangement provides numerous advantages. The cover protects the vehicle surfaces from direct exposure to the sun's rays. As a result, it reduces the effects of uncomfortably hot temperature to which a vehicle's interior typically rises during the summer. Both the interior and exterior of the vehicle can be protected from the damaging effects of the sun, such as scorching, scratching, fading, discoloration and wear, resulting in lower maintenance costs, longer car life, enhanced resale value as well as reducing the need to purchase new car. In the same regard, energy is conserved by reducing the need for air conditioning. The finish is protected from hail, rain and mud rain, thus reducing color fading. It also reduces the time, human energy and money frequently spent on washing and polishing the vehicle. The effortless and convenient way of deploying the cover with the push of a button or a lever or by remote control, enables the unwell and the disabled drivers to operate and enjoy the comfort of their automobile. The owner does not need to build expensive car garage next to the residence. The new invention enables the owner to park the car anywhere, protected at all time without the need for expensive covered garage.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which:

FIG. 4 is a plan view of assembly of round rotatable frames arranged in a rectangular form and engaged at three corners by around corner power transmission gear system, FIG. 5 is a plan view of an example of assembly of one unit of cover sheets as fastened to a single rotatable round frame.

FIG. 6 is an abbreviated plan view of the assembly of cover system showing the rotatable frames engaged to each other with around-corner-power-transmission angle gears and endless cross-chain or cross belt drive on sprockets.

DETAILED DESCRIPTION OF THE PRESENTLY PREFERRED EMBODIMENT

Methods of Automated Deployment of Portable Vehicle Canopy

The following detailed mechanical construction of portable automatic vehicle canopy is designed to fully demonstrate the making, the application and the benefits of this new invention. The basic concept of this new invention is the idea of permanent installation, direct or indirectly, of the main frames of the cover system to the roof of a vehicle. It is from here that all the proposed methods of deploying the cover as detailed below, depend on the permanent fastening aspect.

The whole cover system comprises of two major components along with attachment and installation parts. These are the rotatability of the main frame hinged on the roof of a vehicle and the attachment of the cover sheets to the frames. The other fundamental basis of this application is the various methods of deploying the cover system all of which depend on the foundations mentioned above. These include: (1) around corner power transmission method, (2) engagement of rotatable frames by gearing method, (3) applying power by motor attachment, (4) deployment of the covers by reeling mechanism, (5) deployment of endless cross chain or cross belt on sprockets, and finally (6) direct hinging of the cover sheets to the roof and turning/deploying the sheet with bare hand. The following detailed specification will make this concept more understandable.

Figure 2:
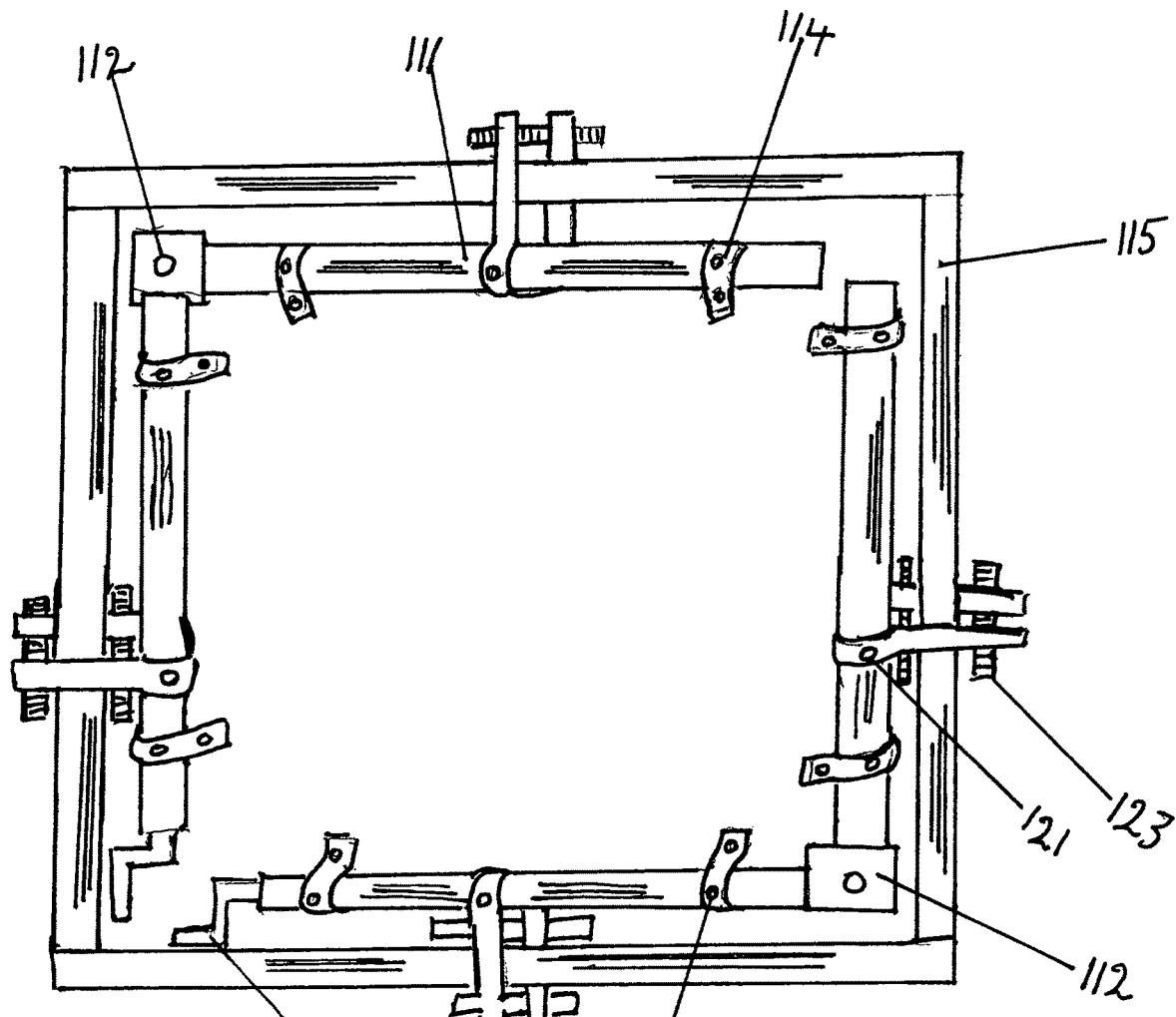
FIG. 2 is an exploded plan view of the mechanical assembly of this invention with elongated rotatable round frames engaged at two ends with power transmission angle gearing system with cranking handles, as installed on the roof rack frames of a vehicle.
Figure 14:
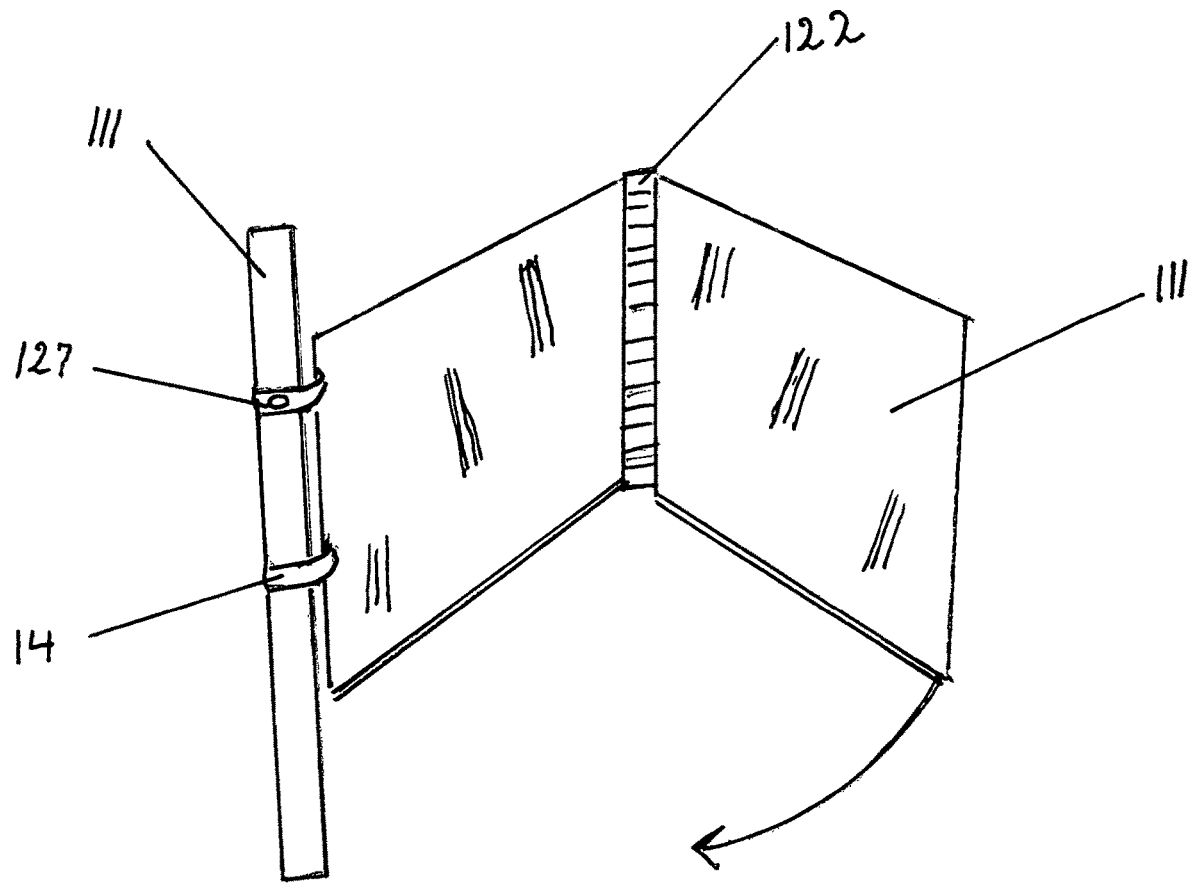
FIG. 14 is a perspective view of a folding sheet fastened to each other by means of a hinge to make it foldable for storage.

As illustrated in FIGS. 2, 5, and 14, rotatable round frame 111 is disposed with cover sheets 118 hinged to it, by means of cover sheet hinge 114.

Mounting the cover system on a vehicle requires the following observation: As illustrated in FIGS. 1, 2, 3, 4, 5 and 7, four units of FIG. 5 are assembled to form a general rectangular shape in preparation to be mounted on a vehicle roof rack 115 and fastened to it by means of installation bracket system 113. The mounting bracket is tightened by bolts 123.

Once the assembly is mounted on the roof of a vehicle, cover sheets 118 are fastened to the rotatable round frames. The installation and fastening of the cover sheets are such that the attachments are arranged in tandem to minimize collision of the cover sheets while in the process of being retrieved to go into storage position.

Once mounted the turning of the frames and sheet require a control mechanism during the deployment process.

Figure 3:
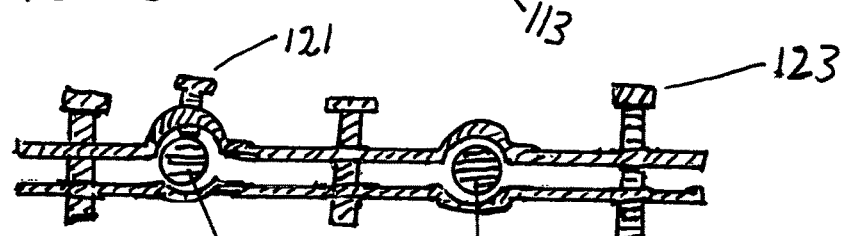
FIG. 3 is a side end view of assembly of an installation bracket system to be deployed when installing the cover system onto a vehicle roof rack.

When the cover sheets are loaded with heavy foreign material such as snow, it will be difficult to turn all the cover sheets together. It is therefore necessary to introduce a mechanism which should help to solve the problem. As shown in FIGS. 2 and 3, bolt 121 is disposed on installation bracket 113 to control the turning of the rotatable round frame 111. When the bolt is loosened, the rotatable frame can rotate on its own longitudinal axis. When the bolt is tightened the rotation control bolt stops the rotatable round frame from turning freely. Screw 127 is disposed on cover sheet hinge 114 to control the turning of cover sheet around rotatable round frame.

When becomes necessary to turn the cover sheet one by one, control bolt 121 is tightened and the cover sheet turning control screws 127 are loosened. When it is necessary to turn all the cover sheets together, the cover sheet turning control screws are tightened, and the rotatable round frame rotation control bolt is loosened. This mechanical arrangement facilitates the deployment of the cover system, one by one when necessary, to cover and uncover the vehicle conveniently, especially when there is extra load on the cover sheets. It would also minimize the strain and the need to make unnecessary maneuvers around the vehicle, especially during the snow period.

As more clearly shown in FIGS. 2, 3 and 4, installation bracket 113 is disposed on the rotatable round frame 115 and tightened in position by means of bolts 123.

As illustrated in FIGS. 1, 2, 4, 5, and 6, the rotatable round frames 111 are fitted with manipulation cranking handles 116 to deploy the cover system. The other alternative means of deploying the cover system are bare hand or by motor which can also be activated by remote control operation.

Figure 1:
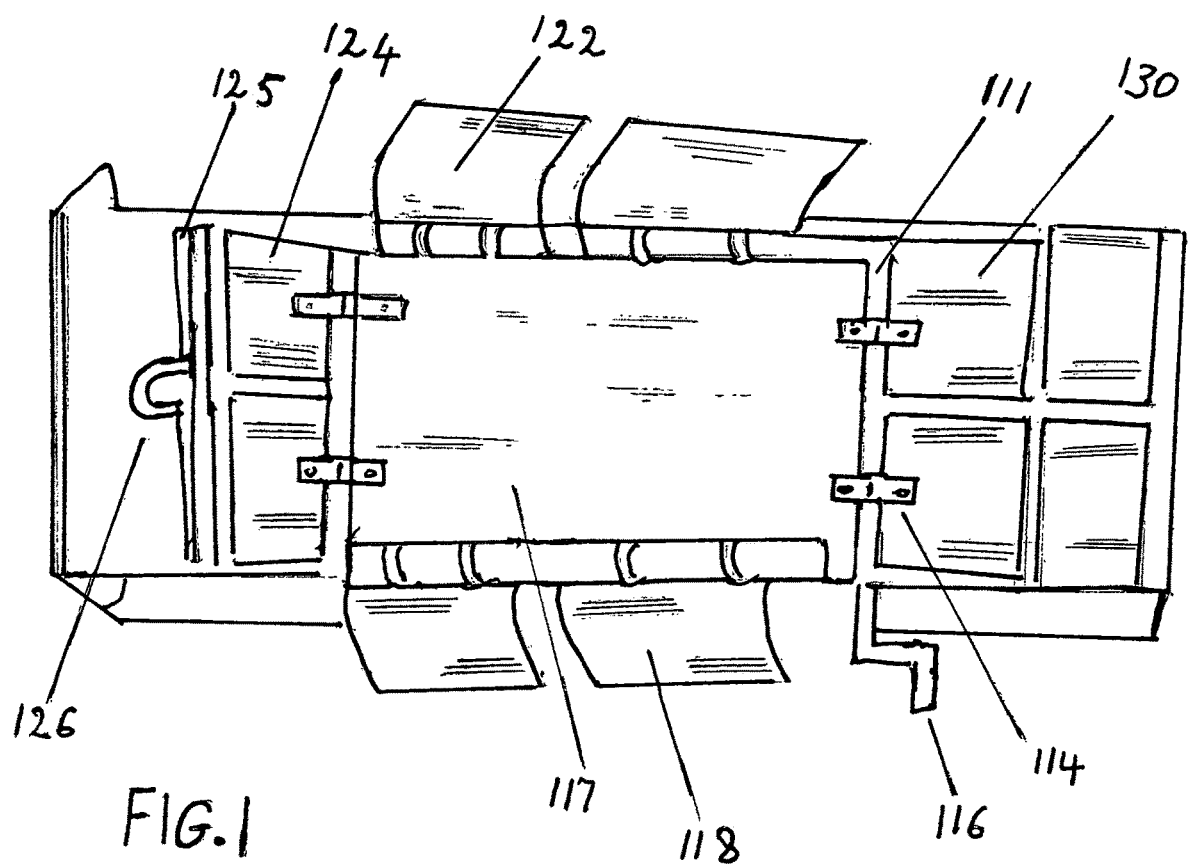
FIG. 1 is a perspective view of the presently preferred exemplary embodiment of this invention showing the cover system as assembled, installed and deployed on a vehicle.
Figure 7:
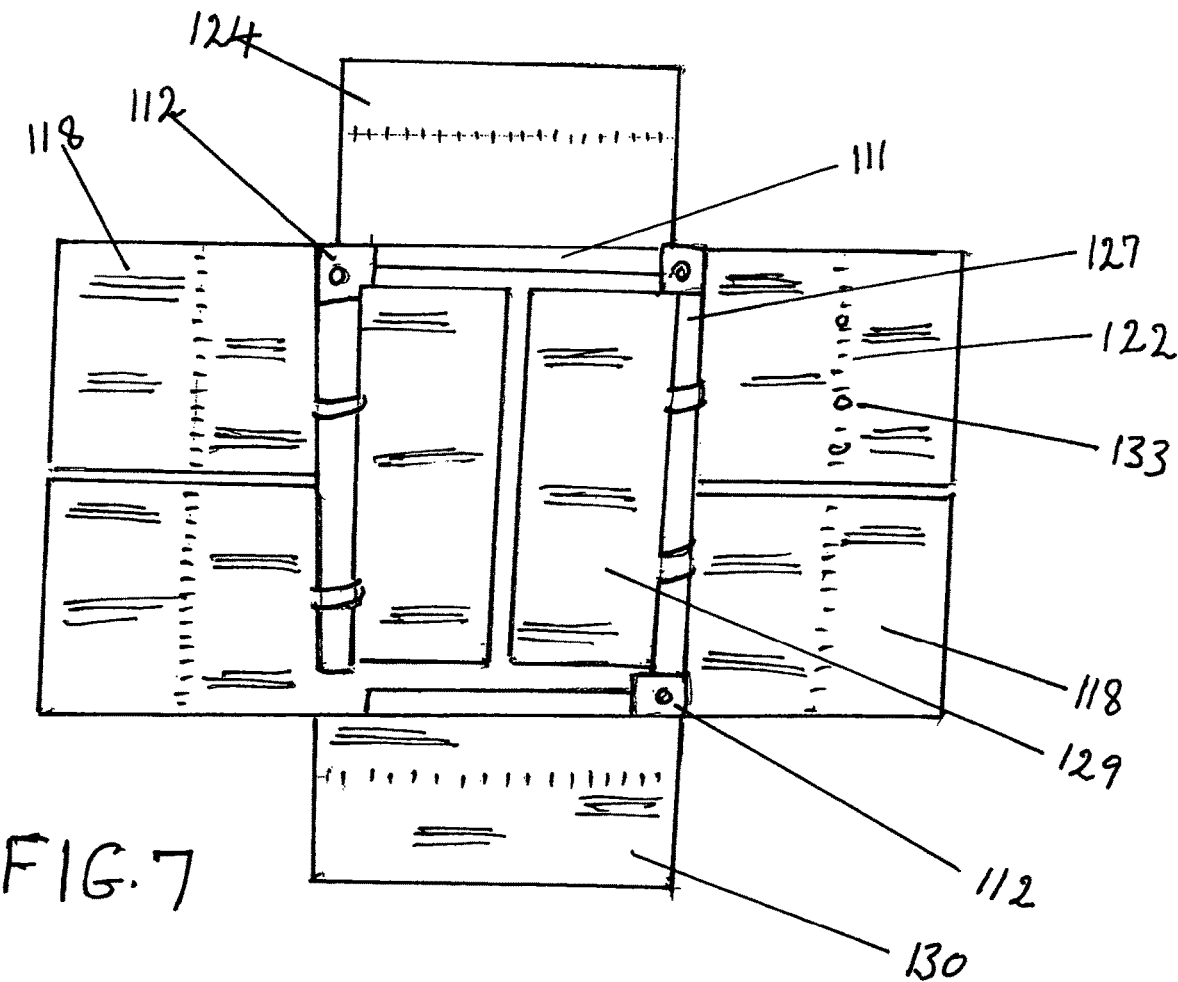
FIG. 7 is a plan view of a complete assembly of the cover system, as assembled and hinged to a vehicle surface also showing expansion hinges on the cover sheets.

As illustrated in FIGS. 1, 2 and 7, cover sheets 118 are assembled disposed and fastened at one side edge to round rotatable round frames 111. The fastening is done by deploying cover sheet clamp 114. The assembly and installed on top of a vehicle roof rack frame 115 by means of bracket system 113. cranking handle 116 is fitted on to the rotatable round frame for turning the frame toward a desired direction.

The turning or rotating function of the rotatable round frame is made by applying force to the crank Cranking mechanism handles 116 is attached to the rotatable round frame to make it easy to turn each rotatable frame one by one. Round-corner power transmission mechanism 112 is disposed to engage the adjacent rotatable round frames at corners where they meet. This arrangement makes it much easier to manipulate and deploy two adjacent cover system simultaneously.

As best illustrated in FIG. 5, the exemplary cover sheets are disposed and fastened, each with one side edge to the rotatable frames 111. This arrangement makes the cover sheets to cover and uncover the vehicle surfaces when the frames are made to rotate in a required direction.

As illustrated in FIGS. 2, and 3, in this exemplary embodiment of the present invention, rotatable round frames 111 are installed on car roof rack frames 115 by means of installation brackets 113. Bracket bolts 123 are deployed to tighten the fastening of brackets 113 on to roof rack frame 115.

As best illustrated in FIGS. 1, 2, 4 and 7, as an improvement to the version which uses only one around-corner power transmission devise, the around-corner power transmission devises are installed on more than one corner of the assembly of the round rotatable frames 111. This makes it easier to deploy the whole cover system by deploying only one crank 116 from one position near the vehicle.

As more clearly demonstrated in FIGS. 2, 4, and 7, the cranking can also be powered by attaching motors to the system. In addition, attaching a remote control devise to the motor makes the deployment of the cover system and therefore, the invention of portable automatic vehicle canopy more realistic as intended in the objectives.

As best illustrated in FIG. 6 of this exemplary mechanism, four rotatable round frames 111 are assembled in a rectangular form similar to that of the shape of a vehicle roof. From among various electrical and mechanical methods of power transmission this invention makes use of two mechanical power transmission methods as examples. These include combination of sprockets and cross chain engagement method on one part, and around corner power transmission gearing method disposed on two opposite corners of the assembly of the cover system as demonstrated below.

In the first example of power transmission method, two around corner power transmission mechanisms 112 are deployed on the opposite corners of the assembly to adjoin and engage the adjacent ends of the frames together. This arrangement is to make the two adjacent frames to rotate simultaneously. These round corner power transmission gears can be deployed on as many corners as necessary for complete automation of the deployment of the system.

In the second example of power transmission method, sprockets 119 are installed on two of the rotatable round frames 111. Crossing chain or belt is installed so as to force the rotating round frames to turn in opposite directions when activated. Cover sheets 118 are fastened to the rotatable round frames. Cranking handle is installed at one end of one of the rotatable round frames. This mechanical arrangement enables the whole cover system to be deployed simultaneously when the crank handle is turned one direction or the other.

The cover system as designed in this invention, whether it is in deployment state or in storage position, requires a mechanism which retains it in that position. Such retainer devise should be able to protect the cover system against flailing when the car is in motion, and against unwanted removal when it is in storage position. The method of achieving such security is specified below.

Figure 8:
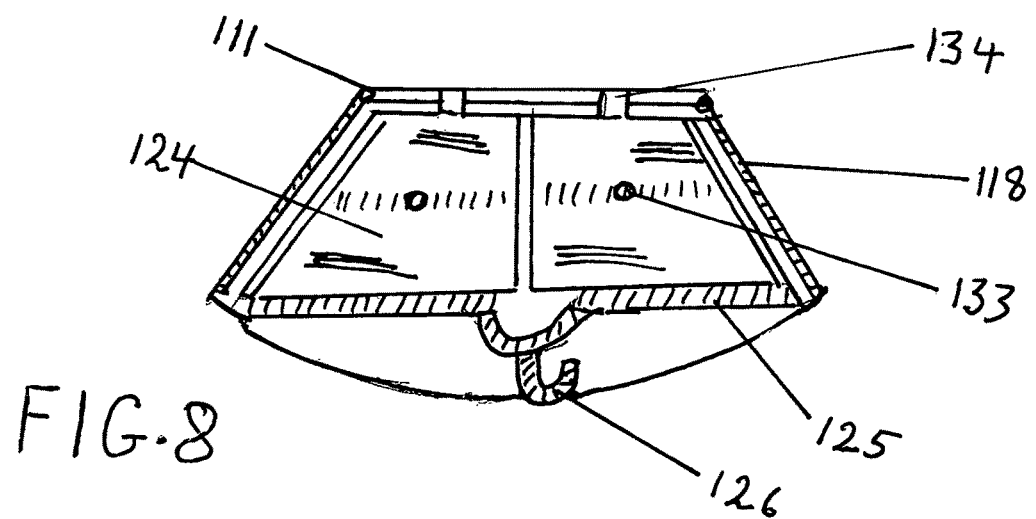
FIG. 8 is a plan view of the present invention showing the front and side end views of the cover sheets for the front wind shield, and cover retention bar and latch system.
Figure 9:
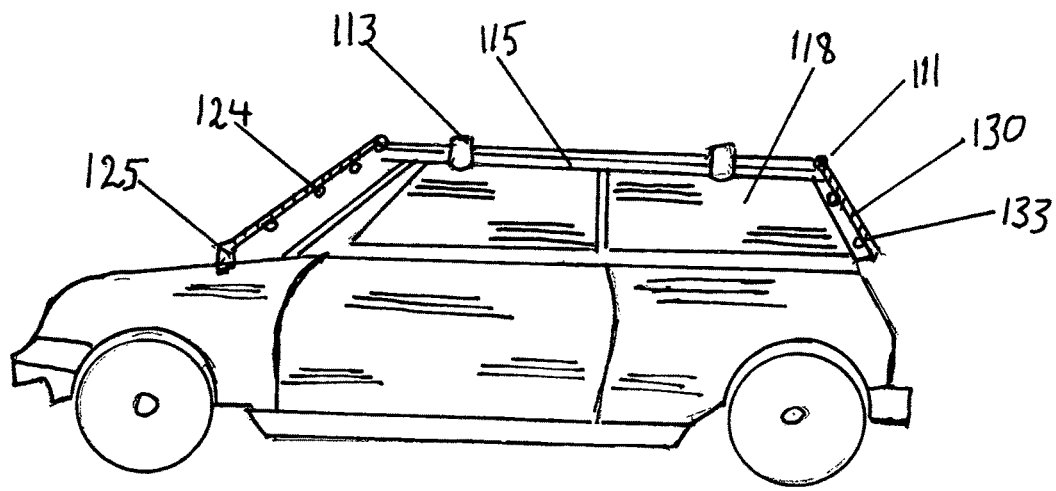
FIG. 9 is a partial side end view of a vehicle showing the cover sheets covering one side end views of the cover sheets for the front and rear wind shields.
Figure 11:
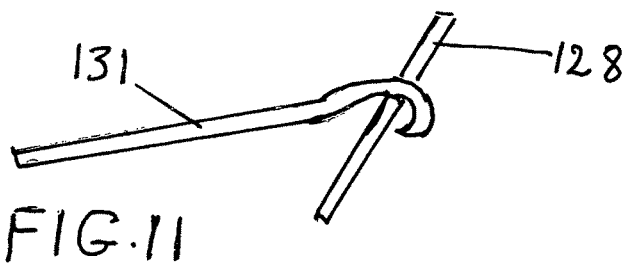
FIG. 11 is a plan view of the presently preferred embodiment of this invention with a security latch system which holds the cover in place.

As best illustrated in FIGS. 8, 9, and 11, front windshield 124 is fitted with retainer bar 125 which is configured to accommodate security latch 126. The combination of both the latch and the retainer bar is deployed to securely hold the front windshield and the rear cover sheets in place both during deployment and when in storage positions. The same objective can be achieved by disposing a simple tying cable over the cover sheets and fastening it to the surrounding objects on the vehicle.

As best illustrated in FIG. 14, cover sheets 118 are fitted with hinge 122. The hinge is designed to facilitate easy folding of the two halves of the same sheet into compact size which is necessary when the cover sheet is to be returned into storage position. Once stored properly in such folded fashion it would not show on top of the vehicle, thus maintaining good external appearance of the vehicle. The foldability of the sheet also helps in minimizing flailing. The other purpose of deploying the hinge is to increase and extend the size of the sheets when it unfolds from a storage position to cover more surface. It is also possible to engage two cover sheets in a way of making them slide into each other to achieve the same purpose. The hinging component is intended to be commonly applicable to all cover sheets in this application.

The cover system so far described provides protection for vehicle windows only. The roof of a vehicle is equally subject to the element. It is therefore necessary to provide protection for the roof of vehicle as specified below. As best illustrated in FIGS. 1, and 7, in this exemplary embodiment, roof cover sheets 129 are permanently disposed on top surface of a vehicle in a storage position. The roof cover can be loosely hinged directly to either the roof 117 or to the rotatable frame 111 for easy unfolding one by one. All the hinging mechanism indicated above can be of spring-loaded hinging type which facilitates the shaking off of the snow. Such arrangement facilitates easy off-loading of debris to the side of the vehicle and returned to its permanent flat position to cover the roof of the vehicle. This additional roof covering component is to supplement the function of full protective coverage for the vehicle.

Any foreign material that lands on vehicle surface creates mess. Debris leave smears on the windows and wind shields. All external surface of vehicles require frequent expensive washing and cleaning because either the vehicle is not properly covered, or the cover itself leaves the smear and dirt on the surface with which it comes in direct contact. The following specification of spacer between the cover and the surface illustrates the method of solving the problem.

As best illustrated in FIGS. 5, 7, and 8, of this exemplary illustration, spacers 133 are disposed on cover sheets close to where they touch the vehicle surface. This way the spacers create and maintain air buffer space between the two surfaces, so that the covers do not freeze or cake on the surface when it is cold. Use of proper material of the spacer prevents damages to the covered surface due to scratches when the two surfaces come in contact. All cover sheets in this application are intended to be provided with spacers. Any cover for a vehicle as designed in this invention, unless it has a means of full protection at all times, faces the effects of the force of the element, such as flailing which damages the property, as well as vandalism or unwanted removal. The following specification illustrates a method of solving the problem.

Figure 10:
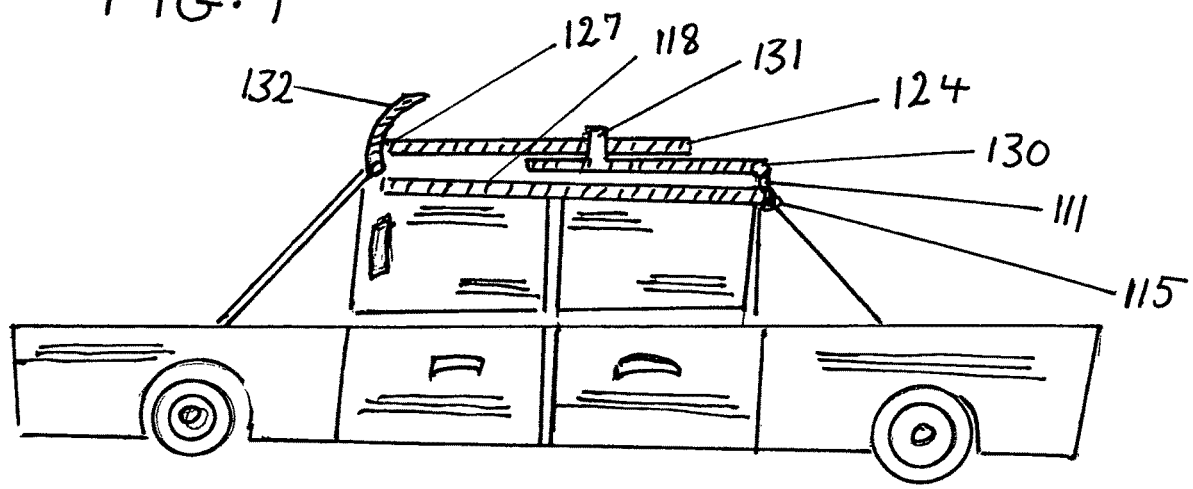
FIG. 10 is a side end view of the cover system demonstrating the sequence of folding up into a storage position on a vehicle roof.

As best illustrated in FIG. 10, the whole cover system with sheets 118, 124, and 130 for all windows and hood surfaces is shown in storage position on top of a vehicle. It also demonstrates the proper sequential manipulation steps; which is that the front windshield cover is turned and folded last after all the other cover sheets have been folded up in storage position. Wind break 132 is also provided to supplement the function of ensuring the security of folded front windshield cover, which is to hold all the system in a stored secure position against flailing, especially when the vehicle is in motion.

As best illustrated in FIGS. 1, 8 and 11, exemplary security system is shown with security latch hook 131 126 disposed and 124 in an engaged to position with the security bar 125 of front windshield cover sheet. Such engagement can prevent disturbance by the element but requires a lock to ensure its safety against unwanted removal.

As illustrated in FIGS. 9 and 10 the windshield cover sheets 118 for the side surfaces as well as covers 124 and 130 for the front and rear windshields are deployed to cover the respective surfaces separately. Each cover sheet is fitted with a bar and spring-loaded locking latch system to keep them in position. Front wind shield cover, is however, configured like vehicle hood lid with security latch and hook disposed on it. It provides two important functions to the cover system. When in deployment, it covers the front wind shield against the element. When all the other cover sections are in storage positions, it folds back and overlays all the other cover sections and functions as a lid. This way it securely locks down on all the covers, thus preventing the other covers from flailing. When provided with a lock, it prevents vandalism. An addition of a wind breaker across the top surface of the wind shield, as in FIG. 10, will provide more protection of the cover sheets especially when the vehicle is in motion.

Vehicles come in different sizes. One size cover system cannot fit all cars. It requires adjustable cover system. These conditions can be met by creating extendable vehicle covers which can be shifted from one vehicle to another and adjust the size of the cover system, especially by extending the main rotatable round to fit on any vehicle.

Figure 15:
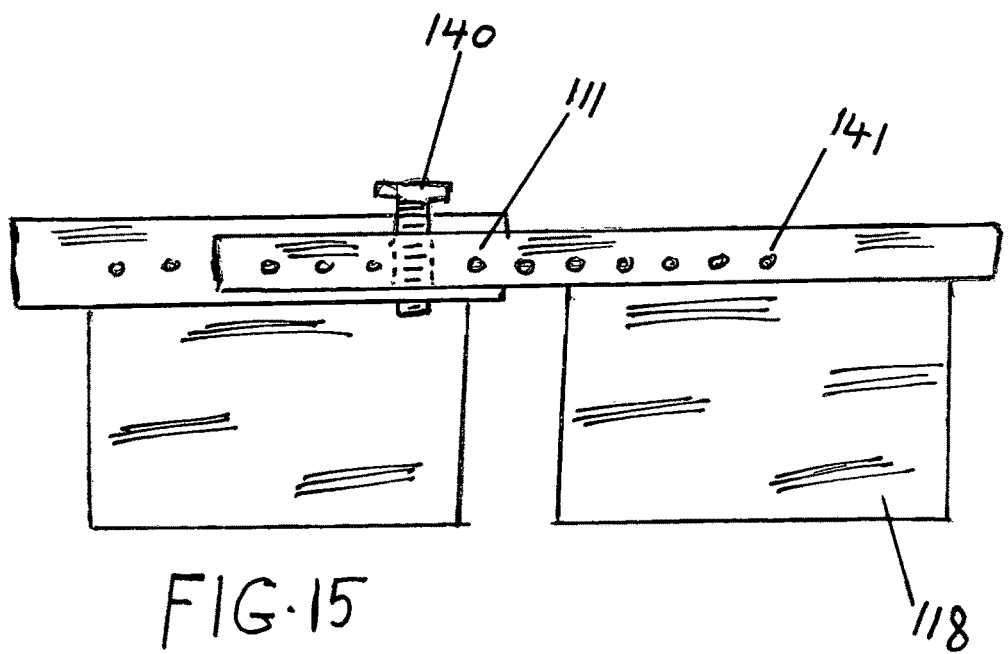
FIG. 15 is a plan view of telescoping method of rotatable round frame fastened to cover sheets; the telescoping method is to make the frames fit on all sizes of vehicles.

As illustrated in FIG. 15, a mechanism of extending the cover system can be designed. One way of doing this, to deploy telescoping rotatable round frame with cover sheets 118 fastened to it. Holes 141 and stop-bolts 140 are disposed for easy adjustment and control of the extension of the frame. This added advantage improves feature and makes the functionality of the cover system of this invention much more complete. One other way of extending the rotatable frames is to make them foldable.

Sequence of Deploying the Cover System

As best illustrated in FIG. 10, the cover system with sheets 118, 124, and 130 for all windows and hood surfaces is shown in storage position on top of a vehicle. It also demonstrates the proper sequential manipulation steps; which is that the front windshield cover is turned last after all the other cover sheets have been folded up in storage position. Wind break 132 is also provided to supplement security of folded front windshield cover sheets against flailing, especially when the vehicle is in motion.

As best shown in FIGS. 2 and 3, the installation of the cover system on the vehicle roof rack is finalized by deploying installation brackets 113 which is tightened by installation bolts 123 of FIG. 3.

Figure 12:
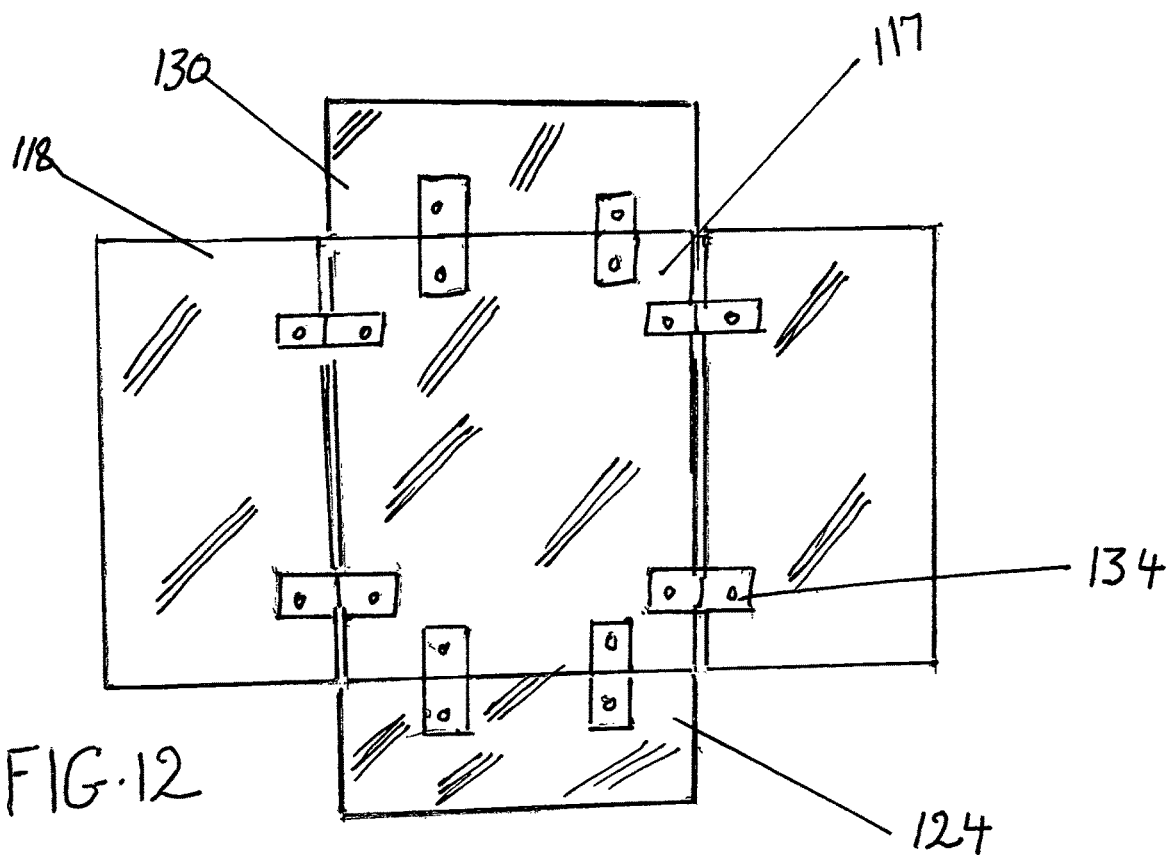
FIG. 12 is a plan view of cover sheets in unfolded position hinged directly to the surface of a car

As best illustrated in FIG. 12, as an additional method, cover sheets 118, 124 and 130 are simply hinged directly to the surface of a vehicle to be covered This version of the cover system allows the vehicle operator to manipulate the cover sheets one by one by hand.

As illustrated in FIGS. 1, 2, 4 and 5, the rotatable round frames 111 are fitted with cranking mechanism 116. Deployment of the installed cover system, can therefore be done by bare hand or by cranking mechanism 116. This however, falls short of one of the main objectives of present invention, which is to make the work of deploying the cover fully automatic and effortless for the full use of the handicapped operator.

In addition to the above illustrated method of transmitting power to deploy the cover system, there are more methods of transmitting power to deploy the proposed cover system for vehicles. Among these are two closely related methods, namely cross-chain and sprocket engagement method and round-corner engagement by gearing mechanism, as detailed below.

As best illustrated in FIG. 4, power transmission gears 112 are installed at three corners on the assembly of round rotatable frames 111. This arrangement makes it much easier to deploy all cover sheets by cranking only one crank handle 116. Various other methods of transmitting power can be used to achieve the same objective.

Cross Chain and Sprocket System

As best illustrated in FIGS. 1, 2, and 6, four rotatable round frames 111 are disposed and arranged to form a rectangular shape similar to the roof of a vehicle. The frames are hinged to roof rack frame 115 or directly to the roof of the vehicle. Sprockets 119 are installed on two of the oppositely positioned rotatable round frames. Endless cross chain 120 is disposed so as to engage the sprockets on the rotatable round frames. Round corner power transmission devises 112 are disposed on opposite corners of the assembly of rotatable round frames so as to engage two adjacent ends of the rotatable round frames. One of the rotatable round frames is fitted with crank handle 116 at one of its free ends. Cover sheets 118 are fastened to each one of the rotatable round frames. When the crank handle is turned in any direct the cross-chain engagement forces the engaged sprockets to turn in opposite directions. Because the rotatable round frames are also engaged by round corner power transmission devises, when the crank handle is turned in any direction, it forces the rotatable round frames and the cover sheets to turn, thereby covering and uncovering the surface of the vehicle. In short it is only the introduction of the mechanism of the combination of the sprocket and cross chain that makes this additional method to complement the function of the other methods.

Reeling Method

The idea of hinging the cover system to the vehicle can be applied to develop different methods of deploying the cover sheet. One of these methods is related to transmitting power with better simplicity. It involves the use of combination of spool and cord on one hand, and the deployment of memory hinge on the other. This mechanism will be clarified in the following specification.

Figure 13:
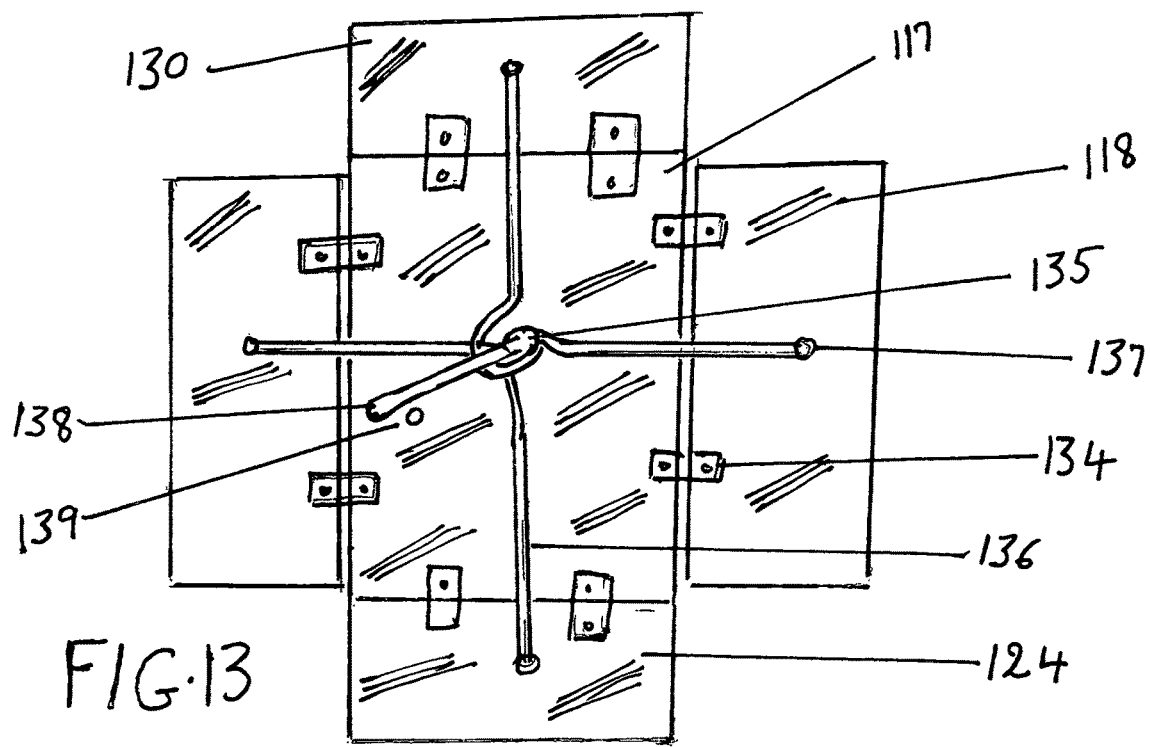
FIG. 13 is a plan view of the cover sheets in a deployed position, showing automatic deployment mechanism by means of a combination of a reel and chords.

As best illustrated in FIG. 13, Cover sheets 118, 124 and 130 are disposed in deployed position covering the vehicle, and hinged to a vehicle roof surface 117 by means of spring-loaded hinges 134. The spring loading is biased outwardly so as to force the cover sheets to spread out and remain in covering position. Reeling spool 135 is disposed and fastened to the roof surface. Cables 136 connect the reeling spool to anchor 137 on the cover sheets. Reeling spool 135 is fitted with spool crank handle 138 to facilitate easy turning of the reeling spool counter clock wise. In this particular example, when the crank handle is turned counter clockwise, it pulls and draws on the cables tight and winds them on the reel, thus pulling the cover sheets inward with it, and hence uncovering the surface of the vehicle. Once the surface is fully uncovered, the cover sheets lay flat on the vehicle roof and the crank handle is securely held in position by means of a handle stopper anchor 139. To cover the surfaces again, the crank handle is released from the anchor allowing the spring-loaded hinges to pull on the cover sheets and force them back to the covering position.

Alternatively, the unfastened other end of the cable can be left free for grabbing by hand and pulling the cover sheets to uncovering position. A stopping latch mechanism can be deployed to stop the cable from returning to its previous position, thus keeping the surface uncovered and retaining the cover sheet in storage position. This mechanism presents yet another method of automatically deploying the cover system.

As best illustrated in FIGS. 1, 2, 7 and 15, four rotatable round frames 111 are disposed and arranged to form a rectangular shape similar to the roof of a vehicle. The frames are hinged to roof rack frame 115 or directly to the roof of the vehicle. Sprockets 119 are installed on two of the oppositely positioned rotatable round frames. Endless cross chain 120 is disposed so as to engage the sprockets on the rotatable round frames. Round corner power transmission devises 112 are disposed on opposite corners of the assembly of rotatable round frames so as to engage two adjacent ends of the rotatable round frames. One of the rotatable round frames is fitted with crank handle 116. Cover sheet 118 is fastened to each one of the rotatable round frames. When the crank handle is turned in any direct the cross chain engagement forces the engaged sprockets to turn in opposite directions. Because the rotatable round frames are also engaged by round corner power transmission devises, when the crank handle is turned in any direction, it forces the rotatable round frames and the cover sheets to turn, thereby covering and uncovering the surface of the vehicle. This additional method of deploying the combination of sprockets and cross-chain method complements and helps to achieve the objectives of this invention.

Direct Hinging and Manual Operation Method

As best illustrated in FIG. 12, the cover sheets 118 are hinged directly to the roof surface of a vehicle by means of spring-loaded hinges 134. The hinging can also be to rotatable frame 111. The direct hinging facilitates easy installation. Each cover is then deployed with bare hand, one by one.

Cover System Installation Steps

As illustrated in FIGS. 1, 4 and 7, four of such assemblies as in FIG. 5 are assembled to form a rectangular shape in preparation to be installed on a vehicle roof rack 115. and fastened to it by means of installation bracket system 113. Once the assembly is mounted on the roof a vehicle, the cover sheets are fastening to the rotatable round frame in tandem to minimize collision of the cover sheets while in the process of folding up to go into storage position.

In general, the process of deploying portable automatic vehicle cover as detailed above has to strictly follow a pre-set sequence in the following manner:

First, for the purpose of explaining the process, assume that the cover devise is already in a deployed position of covering a vehicle like in FIG. 1. First, to uncover the vehicle, the security latches are disengaged from the retainer security bars. Second, the cranking mechanism which engages the rear and the left side rotatable round frames is activated so as to lift up the covers fastened to them, in the process, uncover the widows and ultimately lay flat on the roof of the vehicle in storage position. Second, the cranking mechanism which engages the front and right side rotatable round frames is activated so as to uncover the respective windshield and windows; fold up and ultimately lay flat over the already folded covers and hold them in stored position. Finally, the retainer bars and latches are engaged and fastened to secure the cover system in stored position. Third, to cover the vehicle like FIG. 1, it only requires to directly reverse the above described process of uncovering the vehicle. Finally, it is important to engage the security bars and latches to secure the covers in place.

This, along with the above described embodiment of this preferred invention, completes and meets all the objectives and benefits of this invention; which is to make it deployable at all times, in all places and under all conditions; thus enabling the vehicle operator to effortlessly provide full protective cover for a vehicle, regardless of the operator's physical condition.

Although only a few exemplary embodiments of this invention have been described in detail above, those skilled in the art would readily appreciate that many modifications are possible in the exemplary embodiments without materially departing from the novel teachings and advantages of this invention. Accordingly, all such modifications are intended to be included within the scope of this application as defined in the following attached claims.

What is claimed is:

1. A cover for a vehicle, said vehicle having a vehicle passenger compartment and vehicle outer surface, said vehicle outer surface comprising a first side surface, a second side surface, a front windshield surface, a rear windshield surface, a front hood surface, a rear hood surface, and a roof surface; said cover comprising:
    a plurality of cover sheet;
    a plurality of hinges;
    said plurality of cover sheet disposed on said vehicle surface;
    said plurality of hinge disposed to hinge said cover sheets to said vehicle surface, said plurality of hinges having memory component, said hinge capable to return said plurality of cover sheet to predestined surface covering position;
    a spool, said spool disposed and fastened to a permanent object on said vehicle surface;
    a plurality of reel, said reel having one first end and one second end, said reel fastened to said spool at its said first end, said reel fastened to said cover sheet at its said second end;
    crank handle, said crank handle attached to said spool, said crank handle configured to provide rotational force to said spool and wind said reel on the spool when force is applied to said crank handle, and uncover said vehicle surface;
    an anchor; said anchor installed on an object on said vehicle surface;
    plurality of stoppage knots, said stoppage knots installed along the length of said reel;
    a plurality of hinges, said hinges having memory component, said plurality of hinges deployed to hinge said cover sheet to said surface of a vehicle, said hinge to force said cover sheet back to covering position of said surface of a vehicle when said reel is released from said anchor; and
    combination of said anchor and said stoppage knots deployed to stop said reeling action at any desired stage of deployment, said combination of action of said spool and reel capable to facilitate deployment of cover system reeling to cover and uncover said vehicle surface automatically.

2. The cover of claim 1, further comprising plurality of spacers disposed on said plurality of cover sheets, for spacing said cover sheets from said vehicle outer surface.

3. The cover of claim 1, further comprising wind break configured to be disposed across the top area of said front windshield surface.

4. The cover of claim 1, further comprising motor for powering said spool turning, said motor engaged to said spool, said motor to enable easy turning of said spool for pulling said reel along with said cover sheet so as to allow said cover sheet to cover said surface of vehicle when said hinge with memory mechanism pulls on it.

5. The cover of claim 3, further comprising a remote controller for controlling said motor.

6. A cover of claim 1, further comprising a plurality of retainer device for each retaining a respective one of said plurality of cover sheets in either a deployed or a stored configuration and to hold in place said cover sheet against unwanted removal or flailing.

7. The cover of claim 1, further comprising security lock to hold securely said cover sheet in place against unwanted removal.

* * * * *